United States Patent Office 3,062,703
Patented Nov. 6, 1962

3,062,703
WET-STRENGTH PAPER CONTAINING POLYMERIC DIALDEHYDES
Bernard T. Hofreiter, George Earle Hamerstrand, and Charles Louis Mehltretter, Peoria, Ill., assignors to the United States of America as represented by the Secretary of Agriculture
No Drawing. Filed Dec. 10, 1959, Ser. No. 858,836
4 Claims. (Cl. 162—175)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to improvements in the manufacture of high wet-strength and high dry-strength paper and other felted fibrous cellulosic materials such as board, shaped pulp articles and the like, and relates more particularly to a process for making paper wherein an improved composition is employed as an additive in the beater stage or prior to sheet formation in paper manufacture.

In the application Serial No. 779,036 of Swanson et al., filed December 8, 1958, it is taught that paper having high temporary wet-strength is prepared by tub-sizing paper sheet with dialdehyde starch dispersed in water by means of a borax or bisulfite treatment. In such a process the formed web or sheet is passed through the aqueous dispersion or solution of the polymeric dialdehyde, called dialdehyde starch for convenience, where it is impregnated with this agent in an amount of at least 1.8 percent to impart wet-strength properties in the final dry sheet. An advantage of this type of paper treatment for conferring wet-strength is that the molecular size of the polymeric dialdehyde is not critical. Dialdehyde starch dispersed or solubilized in water by borax or dilute alkali which greatly degrades the polymer and by such acidic substances as sodium bisulfite which can be used to produce limited degradation of the polymer are equally effective for this purpose. A disadvantage is that relatively large amounts of dialdehyde starch must be absorbed by the sheet to obtain good wet-strength.

The disadvantages of tub-sizing in general are threefold: (1) Most paper mills are not equipped with tub-size or size press equipment, (2) large quantities of water absorbed by the sheet must be evaporated during the drying stage, which is costly, (3) weak wet webs or sheets such as toweling cannot be passed through a sizing bath without tearing.

Meller has shown (TAPPI 41, 684–686 (1958); FIGURE 1, p. 681) that periodate oxidized starch or dialdehyde starch produces wet-strength in paper when used as a beater additive to bleached sulfate pulp. The wet-strength values obtained, however, are too low for practical use when applied at the relatively high levels of 5 and 10 percent of the fiber weight as will be shown hereinafter. Meller found no increase in dry-strength of the dialdehyde starch treated paper; in fact the dry-strength was found to be lower than that of the untreated paper. The extent of dispersion of the periodate oxystarch in boiling water was not defined by Meller but considerable degradation of the polymeric dialdehyde would have occurred if boiling was prolonged for several hours which would result in low retention in the fiber. On the other hand, a short boiling water treatment would leave a large amount of highly polymeric dialdehyde which would not be adequately dispersed and would be poorly distributed on the fiber.

The principal objective of this invention is to provide modifications in the molecular structure of the polymeric dialdehyde called dialdehyde starch which improve the properties of the polymer for imparting wet-strength and improved dry-strength to paper when applied to water suspensions of hydrated or unhydrated pulp in the beater, stock chest, head box, or at any other suitable place ahead of the paper-forming step.

We have found that the above and other objectives are accomplished by treatment of cellulosic fibers with polymeric dialdehydes prepared by 70 to 100 percent periodate oxidation of starch and whose molecular size has been reduced by controlled hydrolysis or degradation. The above described dialdehyde starches before hydrolysis or degradation are known to exist in highly polymeric form with molecular weights of the order of 40 million and cannot be used in practicing our invention. Under controlled hydrolysis or degradation of dialdehyde starch, polymeric dialdehydes are obtained having over 80 percent of their molecular distribution in the range not lower than 300,000 nor greater than 5 million which may be used in the practice of our invention as will subsequently be illustrated.

The use of monomeric dialdehydes such as glyoxal and glutaraldehyde as well as alkali degraded dialdehyde starch and dialdehyde starch highly degraded by other means, to yield a high proportion or low molecular weight polymeric materials are not effective for producing wet-strength in paper in the practice of our invention.

In the production of the polymeric dialdehydes suitable for use as beater additives dialdehyde starch is first prepared by known procedures by reaction of from 0.7 to 1 mole of periodate with one mole of starch, which term includes all of the cereal starches such as corn and wheat starch and also the tuber starches which include potato starch. The water-insoluble dialdehyde starch is isolated by filtration or centrifugation and washed essentially free of spent oxidant. It may be dried or used in the wet state for degradation to the molecular weight range useful in practicing our invention. In carrying out the hydrolysis or degradation 3 parts of the dialdehyde starch on a dry basis are slurried in 96.55 parts of water containing 0.45 part of sodium bisulfite and heated at 92° C. for 40 minutes to obtain a uniform dispersion, which on cooling has a viscosity of about 470 centipoises at 25° C. (60 r.p.m. speed of spindle) Brookfield viscometer.

When dialdehyde starch is heated for 30, 40, 70, and 90 minutes under the above conditions the viscosities of the colorless dispersions are 1620, 470, 9.8, and 4.0 centipoises respectively at 25° C. High wet-strength of paper is obtained using dispersions in this viscosity range. Ultracentrifugation and light scattering measurements indicate the molecular weight range of such dispersions to be 300,000 to 5 million.

This procedure is given primarily for illustrative purposes and it is immaterial how the dialdehyde starch is degraded to produce the polymeric dialdehyde in the molecular weight range of the invention. The polymeric dialdehydes may also be isolated from hydrolyzates by precipitation with appropriate solvents, or the aqueous dispersions may be evaporated to dryness prior to use in the practice of this invention.

Nitrogen containing resins such as modified urea-formaldehyde and melamine-formaldehyde condensation products are presently used in large volume for imparting wet-strength to paper. These are cationic colloidal aggregates which are retained by the negatively charged cellulosic fiber through electrostatic interaction. However their effectiveness as permanent wet-strengthening agents is due to their further polymerization or curing in the paper during the hot drying stage and during storage of the finished paper rolls.

Marked points of difference in this invention as compared with the prior art lie in the fact that the polymeric dialdehydes used for treatment of the cellulosic fibers do not contain nitrogen and are non-resin forming. After retention in the cellulosic fibers they will react with the cellulose under acidic conditions. The exact nature of the interaction between the polymeric dialdehydes of this invention and the cellulosic fibers in the paper is not completely understood but is presumed to involve acetal formation to produce cross-bonding of the cellulose which makes the paper more resistant to disintegration when wet with water. Air drying at room temperature gives about the same wet-strength as drying at elevated temperatures for several minutes so that an extensive curing period is not required, as is necessary with the cationic melamine-formaldehyde resin. A further advantage is that polymeric dialdehyde aqueous dispersions are colorless in contrast with the colored nitrogen-containing resins and are more suitable for use in white paper products.

The wet-strength achieved using dialdehyde starches is considered to be of a temporary nature since it is reduced upon soaking of the treated paper in water for extended periods of time. However, the wet-strength is more than adequate for such applications as disposable toweling, napkins, and the like. An advantage to the temporary wet-strength is that treated paper scrap and trimmings of paper mills can readily be reused by simply disintegrating it for a short time with dilute alkali, dilute acid, or even hot water to remove the polymeric dialdehydes. Improved tensile dry-strength and burst dry-strength are also achieved as objects of this invention. All of these advantages obtained by the application of partially degraded dialdehyde starch to paper and paper fibers in accordance with our invention constitute an important industrial advance in the art of making wet-strength paper and improve dry-strength paper.

Since it is preferred to apply the polymeric dialdehydes of the invention to cellulosic fibers at the beater or prior to sheet formation the presence of papermakers alum is essential along with small amounts of salts such as sodium, calcium and magnesium bicarbonates, and the like, which are generally present in the water supply. Accordingly, the aqueous dispersion of the degraded dialdehyde starch in the appropriate molecular size range is added to the paper stock in tap water in the beater, stock chest, Jordan engine, fan pump, head box, or at any point ahead of the papermaking wire or screen, following the addition of aluminum sulfate to obtain a pH in the range of 4 to 5 and preferably 4.5. Mineral acids such as hydrochloric acid may also be added to supplement the acidity of the acid salt. The treated cellulosic fibers are then passed over the screen of a Fourdrinier machine and formed into paper in the usual manner. Absorption by the fibers of 0.3 to 1 percent of the polymeric dialdehydes based on the dry weight of the paper sheet, give wet-strength and improved dry-strength to the paper.

The invention is illustrated further by means of the following examples.

EXAMPLE 1

Polymeric dialdehydes prepared from 95 percent periodate oxidized starch under varying conditions of degradation were applied in aqueous dispersions at various concentrations to bleached and unbleached paper pulp in suspension in tap water with the addition of aluminum sulfate after which the treated stock was made into paper on a laboratory handsheet machine and tested for dry and wet tensile strength. Tensile strength values are given in pounds per inch width. Unless otherwise stated wet tensile strength is given for a 30-minute soaking period at 23° C. in distilled water.

Bleached sulfate pulp which had been beaten to a Schopper-Riegler freeness of 700 ml. was used. Three hundred and forty milliliters of a tap water slurry (300 p.p.m. total hardness as carbonate) containing 1.2 grams (dry basis) of the pulp was adjusted to approximately pH 6 with hydrochloric acid. To the slurry was added 11 percent of papermaker's alum (on weight basis of dry pulp) and the pH was adjusted to approximately 4.5 with hydrochloric acid if this pH had not been obtained through addition of the aqueous acid salt solution. After the slurry was agitated for several minutes, an aliquot of polymeric dialdehyde dispersion equivalent to 2.5 percent of dry weight of the pulp was introduced and thoroughly mixed with the pulp slurry at approximately pH 4.5. Sheets were then formed on the wire using diluent water at pH 4.5 and dried according to the TAPPI standard procedure, T402m–49.

This example illustrates the necessity of having the proper molecular weight range of polymeric dialdehydes in aqueous dispersions or solution for obtaining good wet- and dry-strengths in the paper sheet.

*Table I*

| Dialdehyde starch-bisulphite dispersion time, min. | Molecular weight range | Dialdehyde starch retention, percent | Tensile strength, lbs./in. | |
|---|---|---|---|---|
| | | | Dry | Wet |
| 30 | 800,000–5,000,000 | 0.65 | 32.1 | 6.7 |
| 40 | 500,000–4,000,000 | 0.63 | 37.0 | 8.7 |
| 60 | 300,000–3,000,000 | 0.38 | 34.2 | 7.1 |
| 180 | Below 300,000 | 0.19 | 31.2 | 4.0 |
| Untreated paper control | | | 27.3 | 0.8 |

Table I shows the molecular weight range of over 80 percent of the polymeric dialdehydes in dispersions obtained by hydrolyzing a 3 percent suspension of dialdehyde starch in bisulfite solution for various periods of time at 92° C. as described above. Within the molecular weight range of 300,000 to 5 million exceptional wet tensile strengths are obtained. Wet-strength in paper is directly related to the retention of dialdehyde starch in the cellulosic fibers which in turn is dependent upon the molecular weight range of the polymeric dialdehydes in the aqueous dispersion used.

*Table II*

| Dialdehyde starch-borax dispersion time, min. | Molecular weight range | Dialdehyde starch retention, percent | Tensile strength, lbs./in., wet |
|---|---|---|---|
| 30 | 15,000–20,000 | 0.02 | 1.6 |
| 60 | <20,000 | 0.02 | 0.8 |
| 90 | <20,000 | 0.02 | 0.8 |

Table II shows that dialdehyde starch dispersed in 1.8 percent borax solution (based on the weight of the dialdehyde starch) at 92° C. for various periods of time is degraded excessively to too low a molecular weight range of the polymeric dialdehydes to obtain good retention in the cellulosic fibers and be effective as a wet-strength additive to cellulosic fiber prior to sheet formation.

The use of the monomeric dialdehydes, glyoxal and glutaraldehyde, under the same conditions of application as the degraded dialdehyde starch dispersions, produced no wet tensile strength in paper. A wet-strength value of 0.8 lb./in. was obtained with both of these materials which is the same as that found with the paper control which contained no additive.

EXAMPLE 2

A 95 percent periodate oxidized starch was treated in water to produce a dispersion which contained predominantly polymeric dialdehydes in the molecular weight range of 300,000 to 5 million. Portions of the dispersion as indicated in Table III were added to 340 ml. of a distilled water suspension of 1.2 grams of bleached kraft pulp which had been beaten to approximately 700 ml. Schopper- Riegler freeness, 300 p.p.m. of sodium bicarbonate and then papermakers alum was added in various amounts and the pH adjusted to 4.5 if necessary with hydrochloric acid. Handsheets were prepared on a laboratory sheet making machine. The sheets were couched from the wire on blotting paper and dried according to the TAPPI standard method. The results obtained are shown in Table III.

*Table III*

| Dialdehyde starch | | Alum | | Basis weight | Tensile strength, lbs./in. | |
|---|---|---|---|---|---|---|
| Added, percent | In sheets, percent | Added, percent | In sheet, percent | | Dry | Wet |
| None (control A) | | 11 | | 47.5 | 27.0 | 0.9 |
| None (control B) | | 0 | | 46.3 | 26.4 | 0.8 |
| 0.5 | 0.30 | 11 | 2.2 | 49.6 | 33.4 | 6.6 |
|  | 0.04 | 0 |  |  | 26.1 | 0.9 |
| 1.0 | 0.50 | 11 | 2.2 | 50.2 | 35.7 | 8.8 |
| 2.0 | 0.67 | 11 | 2.8 | 50.6 | 35.9 | 10.3 |
| 2.5 | 0.61 | 11 | 2.2 | 47.8 | 36.9 | 10.6 |
|  | 0.59 | 5.5 | 2.3 | 48.8 | 35.8 | 6.3 |
|  | 0.40 | 2.2 | 1.8 | 47.3 | 34.7 | 4.3 |
|  | 0.34 | 0 |  |  | 32.2 | 2.5 |
| 5.0 | 0.83 | 11 | 1.9 | 49.6 | 37.2 | 10.6 |
|  | 0.84 | 5.5 | 1.2 | 48.3 | 37.7 | 7.3 |
|  | 0.61 | 2.2 | 0.7 | 48.6 | 37.4 | 4.7 |
|  | 0.67 | 0 |  |  | 32.4 | 4.3 |

It will be noted from Table III that at the 2.5 percent level of application increasing amounts of polymeric dialdehydes were absorbed with increasing amounts of alum used and thus in general the wet- and dry-strength of the paper varied with the amount of polymeric dialdehydes in the sheet.

The wet tensile strength of paper formed from pulp treated with only 0.5 percent of dialdehyde starch in suitable dispersion was 790 percent greater than that of the untreated paper controls. At the 2.5 percent and 5 percent levels of addition to pulp with 11 percent alum the increase was about 1300 percent. These are TAPPI wet-strength values of 20 percent and 28 percent respectively where percent wet-strength is the ratio of wet tensile strength to dry tensile strength of the treated paper×100. Approximately the same results were obtained with unbleached kraft pulp and with bleached sulfite pulp.

Britt in Paper Ind. 26, No. 1, pp. 37–41 (April 1944), states that paper which shows a wet-strength greater than 15 percent is properly considered to be wet-strength paper. Calculations of the percent wet-strength of Meller's periodate oxystarch treated paper by the TAPPI formula gave the low values of 9 percent after only one minute of soaking and 6 percent after 60 minutes of soaking and indicates that Meller's paper cannot be considered to be wet-strength paper.

EXAMPLE 3

Improved burst strength is also obtained by treatment of cellulosic pulp with 95 percent dialdehyde starch dispersed according to Example 2 as is shown in Table IV.

*Table IV*

| Dialdehyde starch added, percent | Basis weight | Burst strength, pt./100 lb. |
|---|---|---|
| None (control) | 46.3 | 133 |
| 0.5 | 49.6 | 149 |
| 2.5 | 50.6 | 162 |
| 5.0 | 48.6 | 167 |

EXAMPLE 4

Table V illustrates the change in wet tensile strength with time of soaking for paper treated as in Example 1 using 2.5 percent dialdehyde starch in appropriate dispersion.

*Table V*

| Dry | Wet, time, min. | | | | | | |
|---|---|---|---|---|---|---|---|
|  | 0.5 | 1 | 5 | 10 | 30 | 60 | 90 |
|  | Tensile strength, lbs./in. | | | | | | |
| 34.9 | 9.3 | 9.1 | 8.4 | 8.3 | 7.5 | 6.7 | 6.5 |
| 27.3 [1] |  |  |  |  | 0.2 |  |  |

[1] Untreated paper.

The wet-strength decreased from 26.6 percent of the treated dry-strength after 0.5 of a minute to 18.5 percent after 90 minutes of soaking. However, at 90 minutes it is still considered to be wet-strength paper.

EXAMPLE 5

An important advantage is that dialdehyde starch treated paper does not need to be heated for short or extended periods of time to improve its wet-strength as is required with the melamine and urea resin treated papers. Handsheets were made from bleached kraft pulp as in Example 1. The wet tensile strength of the sheet dried at room temperature was 8.9 lbs./in. Approximately the same wet tensile strength was obtained after drying the sheets for 5 minutes at 100° C. and at 150° C.

EXAMPLE 6

Corn starch oxidized with periodic acid to the extent of 73 percent dialdehyde content was treated to obtain an aqueous dispersion in the molecular weight range of 300,000 to 5 million. An aliquot of the dispersion equivalent to 2.5 percent addition of dialdehyde starch was used with bleached kraft pulp as in Example 1. Handsheets were prepared and wet and dry tensile strengths of the sheets were measured. Dry tensile strength was found to 34.6 lbs./in. and the wet tensile strength 5.57 lbs./in. after 30 minutes of soaking. The percent wet tensile strength is therefore 16 percent, and the sheet may be considered to be wet-strength paper.

Having described our invention and in what manner the same is to be performed, what we claim is:

1. A method of producing paper having high wet-strength and substantially improved dry-strength which comprises applying to the fibers thereof about 0.3 to 1.0 percent by weight of water-dispersible, polymeric, partially depolymerized dialdehydes prepared by heating a 70% to 100% periodate-oxidized starch at about 92° C. for about from 30 to 90 minutes in water containing about 0.15 part of sodium bisulfite per part by weight of said periodate-oxidized starch so that at least about 80% of said polymeric dialdehydes are in the molecular weight range of 300,000 to 5 million.

2. A method of producing paper having high wet-strength and substantially improved dry-strength which comprises adding to an aqueous suspension of cellulosic paper stock water-dispersible, polymeric, partially depolymerized dialdehydes prepared by heating a 70% to 100% periodate-oxidized starch at about 92° C. for about from 30 to 90 minutes in water containing about 0.15 part of sodium bisulfite per part by weight of said periodate-oxidized starch so that at least 80% of said polymeric dialdehydes are in the molecular weight range of 300,000 to 5 million, absorbing about from 0.3% to 1.0% of said polymeric dialdehydes on said paper stock, forming the stock so treated into a waterlaid sheet, and drying the resulting sheet.

3. A method of producing paper having high wet-strength and substantially improved dry-strength which comprises adding to an alum-containing aqueous suspension of cellulosic paper stock water dispersible, polymeric, partially depolymerized polymeric dialdehydes prepared by heating a 70% to 100% periodate-oxidized starch at about 92° C. for about from 30 to 90 minutes in water containing about 0.15 part by weight of sodium bisulfite per part by weight of said oxidized starch so that at least 80% of said polymeric dialdehydes are in the molecular weight range of 300,000 to 5 million, absorbing about from 0.3 to 1.0% of said polymeric dialdehydes on said paper stock while maintaining the aqueous medium at a pH of about 4 to 5, forming the stock so treated into a waterlaid sheet, and drying the resulting sheet.

4. A web of cellulose fibers having high wet-strength and substantially improved dry-strength, said web having a uniform content of about 0.3% to 1.0% of its dry weight of polymeric, partially depolymerized dialdehydes prepared by heating a 70% to 100% periodate-oxidized starch at about 92° C. for about from 30 to 90 minutes in water containing about 0.15 part by weight of sodium bisulfite per part by weight of said oxidized starch so that over 80% of said polymeric dialdehydes are in the molecular weight range of 300,000 to 5 million.

References Cited in the file of this patent

UNITED STATES PATENTS

| | | |
|---|---|---|
| 2,170,272 | Walsh et al. | Aug. 22, 1939 |
| 2,549,177 | Davidson | Apr. 17, 1951 |
| 2,713,553 | Mehltretter | July 19, 1955 |
| 2,880,236 | Mehltretter et al. | Mar. 31, 1959 |
| 2,930,106 | Wrotnowski | Mar. 29, 1960 |

OTHER REFERENCES

"Starches in Paper and Paperboard Manufacture," by James P. Casey, Paper Trade Journal, February 19, 1942, pages 107–117.

Casey: "Pulp and Paper," vol. I, 1952, Interscience Publishers, New York, page 414.

Sloan et al.: "Properties of Periodate Oxidize Starch," Industrial and Engineering Chemistry, vol. 48, May-August 1956, pp. 1165–1172.

TAPPI, vol. 41, No. 11, November 1958, article by Meller, pages 684–686.